US012757000B2

(12) United States Patent
Ansley

(10) Patent No.: US 12,757,000 B2
(45) Date of Patent: Oct. 6, 2026

(54) SYSTEMS AND METHODS FOR PRIORITY EMERGENCY MESSAGES OVER WI-FI

(71) Applicant: Cox Communications, Inc., Atlanta, GA (US)

(72) Inventor: Carol Jeanette Ansley, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 672 days.

(21) Appl. No.: 18/052,345

(22) Filed: Nov. 3, 2022

(65) Prior Publication Data

US 2023/0142570 A1 May 11, 2023

Related U.S. Application Data

(60) Provisional application No. 63/263,865, filed on Nov. 10, 2021.

(51) Int. Cl.

*H04W 4/90* (2018.01)
*H04W 12/06* (2021.01)
*H04W 74/08* (2009.01)
*H04W 74/0808* (2024.01)

(52) U.S. Cl.

CPC ............. *H04W 4/90* (2018.02); *H04W 12/06* (2013.01); *H04W 74/0808* (2013.01); *H04W 74/0875* (2013.01)

(58) Field of Classification Search

None

See application file for complete search history.

(56) References Cited

U.S. PATENT DOCUMENTS

2007/0213029 A1* 9/2007 Edney ................. H04L 12/4641 455/456.2
2013/0044596 A1* 2/2013 Zhi ........................ H04W 12/08 370/230
2014/0086212 A1* 3/2014 Kafle ................... H04B 17/345 370/329
2017/0142757 A1* 5/2017 McKibben .............. H04W 4/90
2019/0141507 A1* 5/2019 Wang .................. H04W 52/367
2021/0144778 A1* 5/2021 Cherian ................ H04W 48/06
2022/0240264 A1* 7/2022 Chu ...................... H04W 12/06
2022/0361193 A1* 11/2022 Fang ................... H04W 72/566
2023/0155641 A1* 5/2023 Kim ...................... H04W 76/15 370/252

* cited by examiner

*Primary Examiner* — Rebecca E Song

(74) *Attorney, Agent, or Firm* — Eversheds Sutherland (US) LLP

(57) ABSTRACT

Disclosed are systems and methods for priority emergency messages over Wi-Fi. Particularly, the systems and methods may relate to an emergency message prioritization feature that may be used in association with Wi-Fi networks (for example, based on the 802.11 wireless standard). The feature may allow a station (STA) to request for such prioritization from an access point (AP) to allow the STA to receive priority in message transmission/receipt during emergency situations.

20 Claims, 5 Drawing Sheets

SYSTEMS AND METHODS FOR PRIORITY EMERGENCY MESSAGES OVER WI-FI

CROSS-REFERENCE TO RELATED PATENT APPLICATION

The present application is related to and claims priority from Provisional Application No. 63/263,865 filed on Nov. 10, 2021 titled "SYSTEMS AND METHODS FOR PRIORITY EMERGENCY MESSAGES OVER WI-FI."

TECHNICAL FIELD

This disclosure generally relates to systems and methods for wireless communications and, more particularly, to priority emergency messages over Wi-Fi.

BACKGROUND

In Wi-Fi networks (for example, networks that function in accordance with the 802.11 wireless standard), one or more stations (STAs) may transmit and/or receive messages through one or more wireless access points (APs). Given the number of wireless devices that are used to perform wireless communications, any given physical area may include a number of APs and STAs. Consequentially, the STAs may contend for usage of available bandwidth to transmit and/or receive messages over the wireless network. This may be problematic in emergency situations where it may be crucial for one particular device to transmit and/or receive messages quickly.

DETAILED DESCRIPTION

Figure 1:
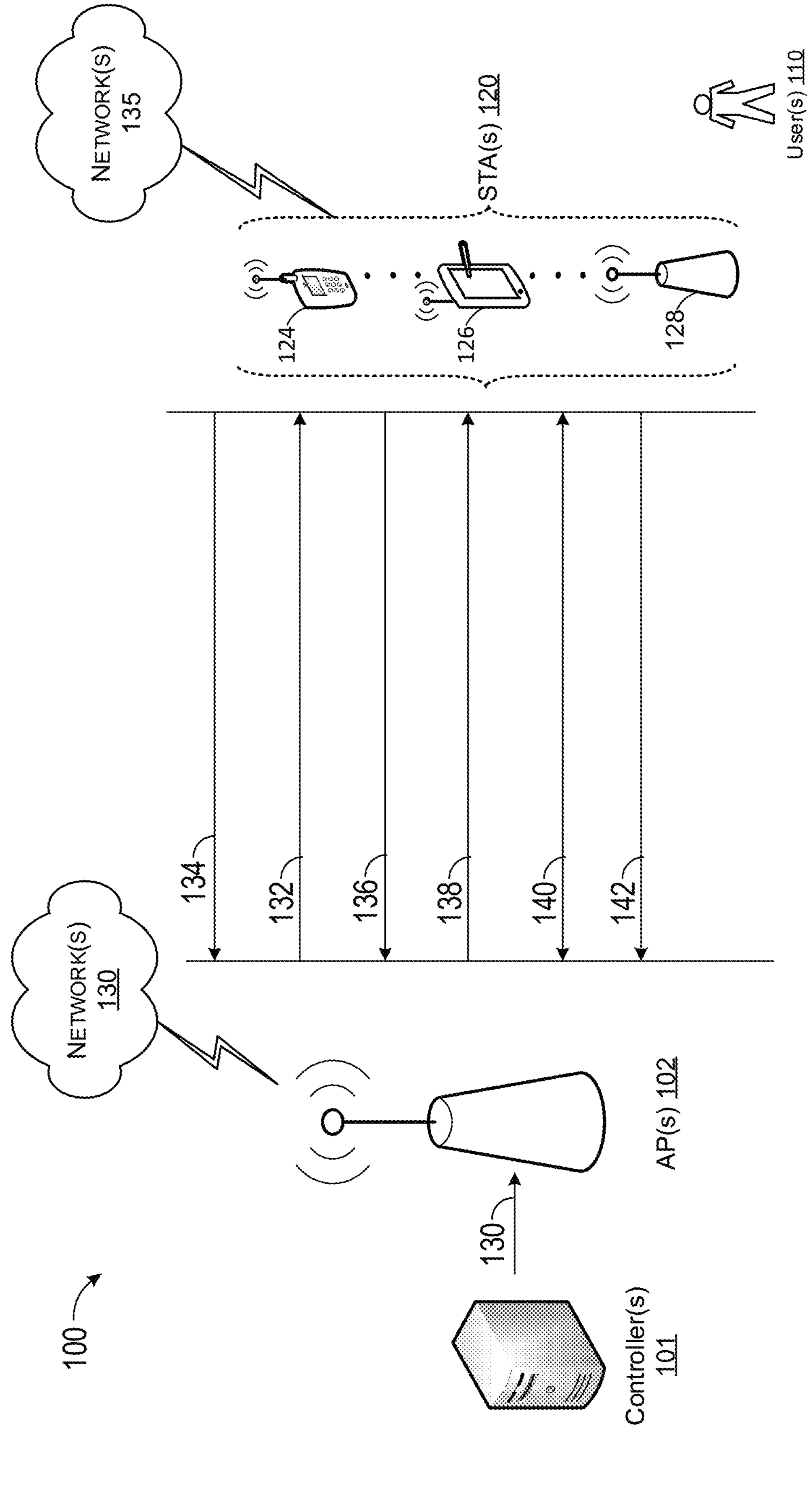
FIG. 1 is a network diagram illustrating an example network environment for priority emergency messages, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

This disclosure generally relates to an emergency message prioritization feature that may be used in association with Wi-Fi networks. This feature may be referred to herein as a national security and emergency preparedness ("NSEP") feature or an "emergency preparedness communications service" ("EPCS"). The disclosure may generally describe the functionality of this emergency preparedness communications service. The disclosure may also specifically address at least two technical challenges associated with this emergency preparedness communications service: how and when to determine when to enable this feature in an access point (AP) in a network, and how to manage additional traffic from other APs that may exist in the vicinity.

Generally, the emergency preparedness communications service may allow a STA to be authenticated by an AP to enable priority traffic processing for that STA with the AP. After the STA has been authenticated by an AP with an active emergency preparedness communications service, the AP may give priority to traffic for that STA in the downstream direction (for example, from traffic from the AP to the STA). In some cases, priority may also be provided in the upstream direction as well. To provide such priority, the AP may attempt to adjust the contention settings of the STA. Particularly, the AP may adjust the contention settings associated with the STA to allow that STA to seize the wireless medium more aggressively. The AP may also adjust contention settings of other STAs to be less aggressive. The AP may adjust its own contention settings when transmitting traffic to the authorized STA as well as adjusting its internal priority queues for data transmission. In this manner, the STA that has been authorized for priority traffic processing may be afforded greater throughput in order to more effectively receive any incoming emergency messages. The STA may alternatively be provided priority traffic processing in a number of other ways as well, which are described in additional detail below. In other embodiments, the AP may direct its other associated STAs to make use of only certain resource units within the larger channel assignment thus preventing those STAs' transmission from interfering with the authenticated STA. This embodiment may provide a clearer block of RUs within the larger channel for the authenticated STA, though the overall bandwidth may be reduced. Resource units (RUs) are a term of art in Wi-Fi that refer to partitions of an active communication channel.

As one example use case involving this emergency preparedness communications service, a house may be burning down in an area, and a fire chief may want to be able to quickly send/receive messages from their mobile device (which may be the STA in this case), but there may be an excessive amount of wireless traffic in the area that may impact the throughput of the mobile device. In such a situation, the fire chief may send a request for use of the emergency preparedness communications service through the mobile device to an AP with which the mobile device is associated. If the mobile device is authenticated, then the emergency preparedness communications service may be enabled for that STA, and the contention parameters associated with the mobile device may then be adjusted. Additionally, on the AP side, the AP may give priority to downstream traffic destined for that mobile device. This may allow for the emergency messages destined for the fire chief's device and presumably relating to the fire to be transmitted more quickly, even if traffic destined for other devices in the area is also received by the AP.

With respect to the authentication (the term "authorize" or "authorization" may also be used interchangeably herein) process, if emergency preparedness communications service is activated in an AP, the AP may perform an authentication of a requesting STA. In some cases, the authentication may involve the AP communicating back to an authentication system to confirm that the requesting device is valid. If it is determined that the STA is authorized for EPCS, then the STA may be authenticated, and the STA may begin receiving priority traffic processing. Otherwise, the STA may not be authenticated and may not receive priority traffic processing.

If it is determined that the STA is not authorized for EPCS, then the AP may send a message to the STA indicating that it has not been authenticated. This message may also be displayed to a user on a user interface associated with the STA.

In some cases, it may be desirable to only selectively activate the emergency preparedness communications service in a given AP for certain period of time. In this manner, scenarios where unauthenticated users may attempt to gain access to this feature may be mitigated. An example of such a scenario may involve an unauthorized user stealing authentication codes to obtain ready access to the network. Such a user could cause a denial of service incident with APs on the network, even when there is no emergency present. To avoid these potential problems that may result if the APs were to be activated for the emergency preparedness communications service by default, APs may instead default to an inactive state for the emergency preparedness communications service (the feature may be disabled by default). In this state in which the feature is not enabled in an AP, a STA may not be capable of being authenticated with an AP to receive priority traffic processing. However, the feature will need to be enabled in a given AP at some point if a real emergency arises. To ensure that the emergency preparedness communications service is enabled in an AP during a real emergency, if an emergency is declared in a specific area associated with the AP, a controller (for example, controller 101 and/or any other controller described herein or otherwise) managing the AP (and any other APs in the area) could identify APs within the affected area(s). The controller could then notify APs in that area that they were "activated." The emergency preparedness communications service would then be activated in those APs, and they may respond to authentication requests from one or more STAs in the area. In some embodiments, an AP would then change a bit in its beacon to indicate that emergency preparedness communications service is activated, allowing STAs to identify it as supporting that service.

Additionally, an STA may itself be used to provide an indication of an emergency in a location to trigger the system controller to activate the emergency preparedness communications service in any local APs. For example, the STA may be a mobile device running an application. The application on the STA may have an authenticated messaging interface that may be used to notify a local entity that an emergency exists at its current location. Many devices have built-in GPS location equipment, and for those that do not, they may be able to query other local devices to determine their location. Another alternative could be that the user of the device can input a current location through a user interface.

Alternatively, a management system may track the location of certain emergency personnel and trigger the controller to automatically enable emergency preparedness communications service in one or more APs. For example, a fire dispatch system may send an alert to a controller that manages APs in a given area when a fire engine is dispatched to a location within that area, so that the controller may proactively activate one or more APs in that area and wait for an STA to associate with an activated AP, authenticate, and request priority. In this manner, a system controller may also integrate with emergency dispatch services. This integration may allow the system controller to compare the location of various emergency vehicles and personnel with APs that may be activated to provide EPCS.

In some cases, once the emergency preparedness communications service is activated in an AP, the AP may transmit beacons indicating that emergency preparedness communications service is active. These beacons may be transmitted into the environment surrounding the AP, and may be intended to be received by one or more STAs in the area. Based on these beacons, an STA may determine that the feature is enabled in an AP, and may have information that the AP is able to authenticate the STA for priority message processing. The STA may then send a message to the AP requesting priority treatment. Based on receiving this message, the AP may communicate back to an authentication system to confirm that the requesting device is valid. The AP may also perform local authentication. Further, the AP may notify the controller if the STA authenticates successfully.

While generally providing an authenticated STA priority access may partially serve to ensure emergency messages in associated with one AP are sent/received in a more efficient manner, a given environment will likely include more than one AP. This may result in the environment being congested with many APs and subtending clients sharing a wireless communication channel. While the EPCS feature allows a device to request priority from a single AP, the EPCS feature may also need to account for this traffic from the other nearby APs and clients in order for the emergency preparedness communications service to be as effective as possible. To accomplish this prioritization, the systems and methods described herein may not only involve authenticating the STA against the AP, but may also consider the traffic from these other APs as well.

To account for any other APs in the area, the system controller may evaluate if there are other APs under its management close to the AP with the STA granted priority treatment. If the controller determines that there are APs nearby that could also contribute interference, the controller can direct those APs to activate their emergency preparedness communications service, if they were not already activated. The controller can also direct those APs to adjust their contention parameters to improve the congestion conditions seen by the authenticated STA and its associated AP.

In some embodiments, the controller may identify other nearby APs by sending a request to the AP that authenticated the STA with emergency preparedness communications service enabled. This may be a request for the AP that authenticated the STA to identify any other nearby APs in a scan. The controller might also ask some or all APs in that location for an airtime congestion report. Additionally, the controller might ask some or all of the APs in that location if any devices have asserted emergency calling and exempt those devices from contention changes. In other embodiments, the system controller may be provisioned with information about the installation locations of APs under its management and control.

In some cases, it may not be possible or desirable for other APs in the area to adjust their contention settings. In such cases, a number of different approaches may be taken to ensure that the impact of traffic to and/or from the other APs is mitigated. One approach may involve moving traffic associated with the other APs to one or more different channels than the channel on which the AP that authenticated the STA and the authenticated STA are communicating by directing the neighboring APs' associated stations to another channel or block of channels. For example, the 2.4 GHz band includes several non-overlapping 20 MHz channels. The AP that authenticated the STA may remain on its initial channel, and the other APs may be requested by the controller to move to other channels in the 2.4 GHz band. In some cases, only some of the APs may be requested to move to other channels (for example, APs may be requested to move until a threshold level of throughput is possible with the AP that authenticated the STA and any remaining APs on that channel). Additionally, the request for the other APs to move to the other channels may also be made by the initial AP as well (as an alternative to the controller making the request).

Another approach may involve directing the other APs to send their associated clients on different bands (for example, 5 GHz band in the previous example that used a 2.4 GHz channel) rather than simply changing the channels on which the APs operate within a given band (for example, a Wi-Fi router may include multiple radios configured for different bands). Once emergency preparedness communications service is disabled on the AP that authenticated the STA (for example, when the emergency subsides), the other APs and their associated clients may return back to their original band and/or channels, or may remain on the bands and/or channels that they moved to. If the AP that authenticated the STA is using multi-link operation, that AP may direct its other associated STAs to stop using at least one link over which the authorized STA communicates. If other nearby APs are using multi-link operation, the controller may direct one or more of those APs to stop operation on links that overlap with the frequencies and/or channels being used by the authorized STA.

In some embodiments, emergency preparedness communications service may be disabled in the AP that authenticated the STA in one of several ways. A first manner in which the emergency preparedness communications service may be ended may include disassociation of the authenticated STA from the AP that authenticated the STA. A STA may become disassociated from an AP by directly sending a disassociation message, an AP may disassociate a STA similarly, or an AP may decide a STA is no longer associated because the STA has not communicated with the AP within a set period of time. In any of these cases, the AP that authenticated the STA may notify the controller that the STA is no longer associated, and in parallel to providing this notification, may reset its downstream policies to not favor the STA. The AP may also reset the contention settings in all of its remaining associated devices to return local operation to normal. Additionally, in some cases, the AP that authenticated the STA may disable its emergency preparedness communications service (or the controller may instruct the AP that authenticated the STA to disable emergency preparedness communications service) to prevent some of the malicious types of activity mentioned above.

In some embodiments, there may be a hysteresis period before the AP takes these actions, in case the STA is only temporarily out of range of the AP. Once the controller is notified that the STA has left the range, the controller may consider whether the larger emergency that resulted in the need for the emergency preparedness communications service has also been rectified. In some cases, this determination may be a condition for the controller to reset all of the APs to their former inactive status for emergency preparedness communications service. Again, there may be a hysteresis period before the controller takes any action in case the emergency is still active. The APs, in turn, may reset the contention settings of their associated devices after being directed to disable EPCS.

Alternatively, the STA may indicate to its associated AP that it is withdrawing its prioritization request. The AP may notify the controller that it no longer has an STA requesting priority access and may reset its downstream policies to no longer favor the STA. The AP may also reset the contention settings in all of its associated devices to return local operation to normal. The controller may leave the APs in that location activated for a configurable amount of time, which may in turn depend upon the method of activation of the emergency services.

In some cases, the system controller may be notified that the emergency has been abated from another system. In that case, the controller may notify all of the APs to return to their previous settings. The APs in turn may reset the contention settings of their associated devices. The AP with the STA may continue to allow the device to be associated, but return its priority levels to normal settings. The AP may send an EPCS rejection message to the STA to notify it that its privileges have been revoked.

In some cases, there may be more than one authenticated STA granted priority access on an AP. For example, returning to the emergency services example, a fire chief may claim priority for his smartphone, and an EMT (emergency medical technician) might also claim priority for his laptop to communicate with a hospital emergency physician. If one STA leaves the area, as in the first embodiment, or revokes its prioritization request, as in another embodiment, the AP may not tear down the prioritization status associated with the remaining device since that device was independently associated. Alternatively, the AP might tear down the prioritization status of the remaining device. For example, the controller after being informed that the first device is no longer requiring priority service may direct the AP to terminate priority service to the remaining device based on prior provisioning.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment for priority emergency messages, according to some example embodiments of the present disclosure. Wireless network 100 may include one or more STA(s) 120, one or more controller(s) 101, and one or more access points(s) (AP) 102, which may communicate in accordance with IEEE 802.11 communication standards. The STA(s) 120 may be mobile devices that are non-stationary (e.g., not having fixed locations) or may be stationary devices. The one or more controller(s) 101 may be systems or devices configured to manage any of the AP(s) 102 and/or STAs 120. While reference may be made herein to a controller performing particular functionality, it should be noted that this same functionality may similarly be performed by any of the AP(s) 102 and/or STA(s) 120 as well.

Figure 3:
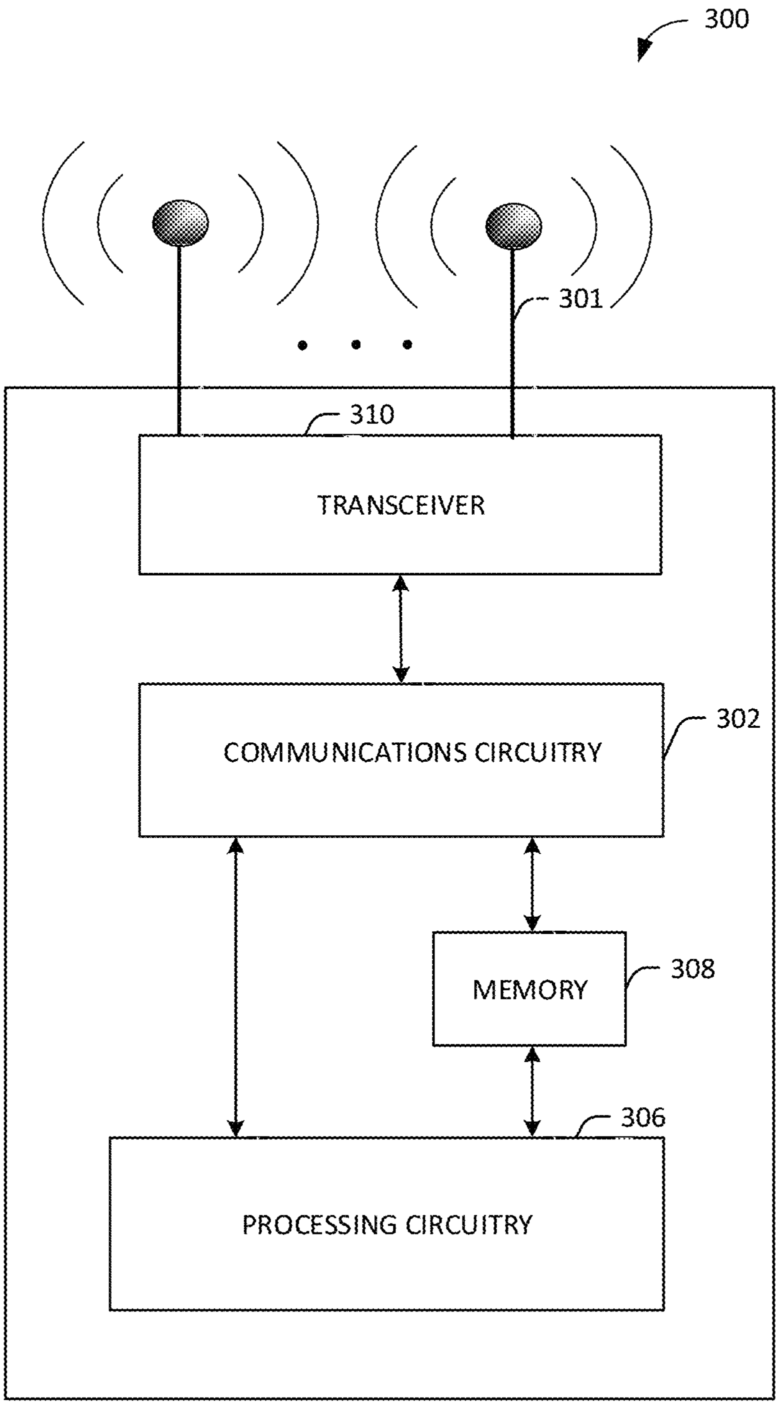
FIG. 3 illustrates a functional diagram of an exemplary communication station, in accordance with one or more example embodiments of the present disclosure.
Figure 4:
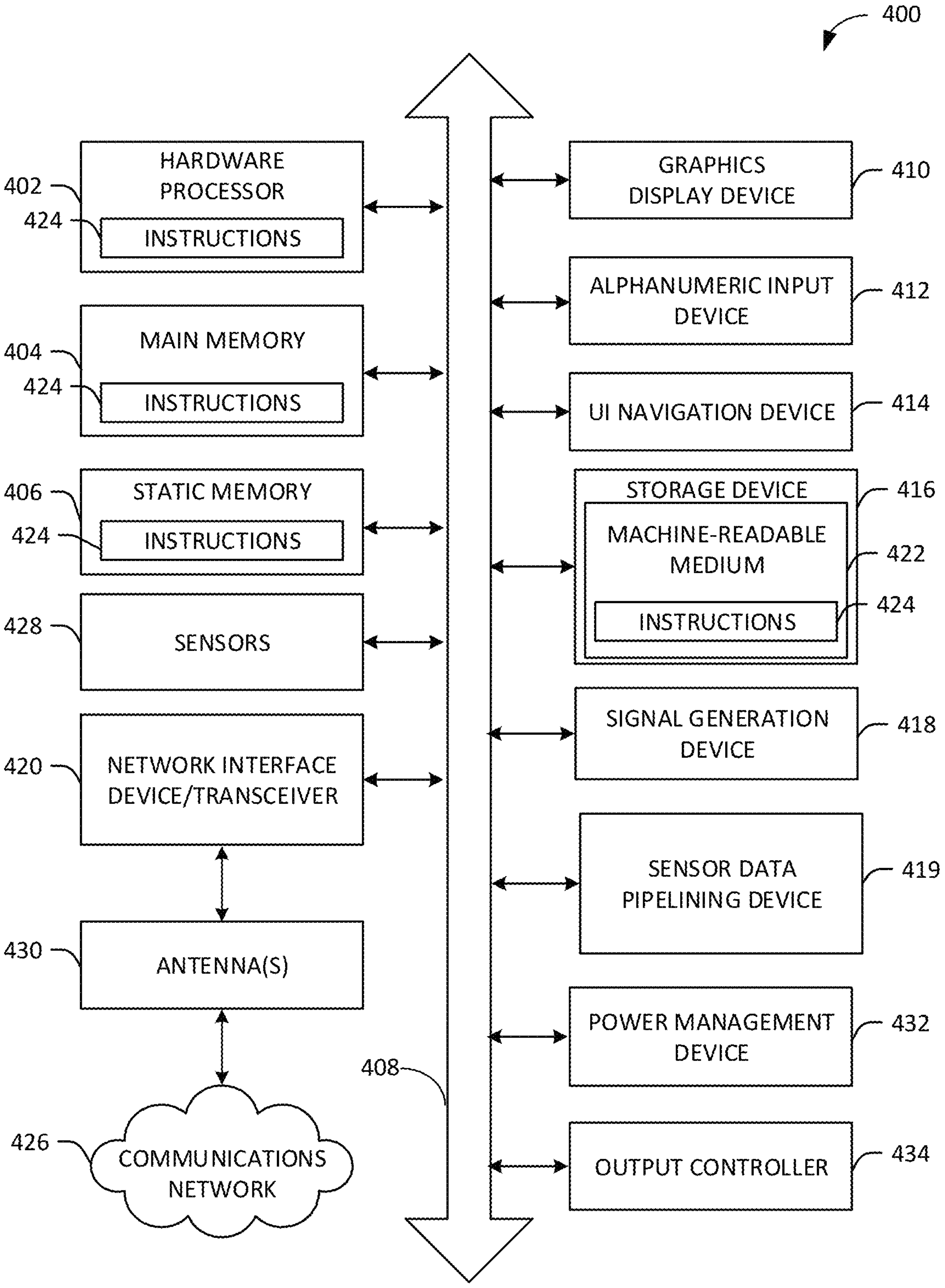
FIG. 4 illustrates a block diagram of an example machine upon which any of one or more techniques (e.g., methods) may be performed, in accordance with one or more example embodiments of the present disclosure.

In some embodiments, the STA(s) 120, the controller(s) 101 and the AP(s) 102 may include one or more computer systems similar to that of the functional diagram of FIG. 3 and/or the example machine/system of FIG. 4.

One or more illustrative STA(s) 120, controller(s) 101, and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, and a dependent STA. The one or more illustrative STA(s) 120 and the AP(s) 102 may be STAs. The one or more illustrative STA(s) 120 and/or AP(s) 102 may operate as a personal basic service set (PBSS) control point/access point (PCP/AP). The STA(s)

120 (e.g., 124, 126, or 128) and/or AP(s) 102 may include any suitable processor-driven device including, but not limited to, a mobile device or a non-mobile, e.g., a static device. For example, STA(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

The STA(s) 120, controller(s) 101, and/or AP(s) 102 may also include mesh stations in, for example, a mesh network, in accordance with one or more IEEE 802.11 standards and/or 3GPP standards.

Any of the STA(s) 120 (e.g., STAs 124, 126, 128), controller(s) 101, and AP(s) 102 may be configured to communicate with each other via one or more communications networks 130 and/or 135 wirelessly. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs).

Any of the STA(s) 120 (e.g., STAs 124, 126, 128), controller(s) 101, and AP(s) 102 may include one or more communications antennas. The one or more communications antennas may be any suitable type of antennas corresponding to the communications protocols used by the STA(s) 120 (e.g., STAs 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the STAs 120 and/or AP(s) 102.

Any of the STA(s) 120 (e.g., STAs 124, 126, 128), controller(s) 101, and AP(s) 102 may be configured to perform directional transmission and/or directional reception in conjunction with wirelessly communicating in a wireless network. Any of the STA(s) 120 (e.g., STAs 124, 126, 128), controller(s) 101, and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the STA(s) 120 (e.g., STAs 124, 126, 128), controller(s) 101, and AP(s) 102 may be configured to perform any given directional transmission towards one or more defined transmit sectors. Any of the STA(s) 120 (e.g., STAs 124, 126, 128), controller(s) 101, and AP(s) 102 may be configured to perform any given directional reception from one or more defined receive sectors.

Any of the STAs 120 (e.g., STAs 124, 126, 128), controller(s) 101, and AP(s) 102 may include any suitable radio and/or transceiver for transmitting and/or receiving radio frequency (RF) signals in the bandwidth and/or channels corresponding to the communications protocols utilized by any of the STA(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. utilizing any of 802.11b, 802.11g, 802.11n, 802.11ax protocols, for example), 5 GHz channels (e.g. utilizing and of 802.11n, 802.11ac, 802.11ax protocols, for example), 6 GHz channels (e.g. utilizing any of 802.11ax, 802.11be protocols, for example), or 60 GHz channels (e.g. utilizing any of 802.11ad, 802.11ay protocols, for example), 900 MHz channels (e.g. utilizing 802.11ah). It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some embodiments, and with reference to FIG. 1, examples of operations performed by the controller(s) 101, STA(s) 120, and/or AP(s) 102 may include the following. A controller 101 may send a message to one or more AP(s) 102 instructing the one or more AP(s) 102 to enable an emergency preparedness communications service (although the figure only illustrates a communication from a controller 101 to an AP 102, it should be noted that this is not intended to be limiting, and communications may travel from an AP 102 to a controller 101 as well). As aforementioned, AP(s) 102 may default to an inactive state for emergency preparedness communications service (the feature may be disabled by default). In this state in which the feature is not enabled in an AP 102, a STA 120 may not be capable of being authenticated by an AP 102 to receive priority traffic processing. If an emergency is declared in a specific area associated with the AP 102, a controller 101 managing the AP 102 (and any other APs 102 in the area) could identify APs 102 within the affected area(s). The controller could then notify APs 102 in that area that they were "activated" (for example, as shown in message 129). The emergency preparedness communications service would then be activated in those APs 102, and they may respond to authentication requests from one or more STAs 120 in the area. In some embodiments, the APs 102 may send one or more beacons 132 to indicate that their emergency preparedness communications service is active, allowing STAs 120 to identify them.

At various points in time, one or more STAs 120 may send requests to an AP 102 requesting authentication to use the emergency preparedness communications service in association with the AP 102. If the AP 102 has not enabled the emergency preparedness communications service, then the request may simply be disregarded by the AP 102. Alternatively, the AP 102 may send a response indicating that the feature is not currently enabled. For example, the figure may depict a first request 134 sent by an STA 120 prior to the emergency preparedness communications service being enabled in the AP 102, and a second request 136 sent by the STA 120 after the emergency preparedness communications service is enabled in the AP 102. In this specific illustration, the AP 102 simply disregards the first request 134 (alternatively, as mentioned, the AP 102 may also provide a response to the STA 120 indicating that the emergency preparedness communications service is not enabled). However, in response to the second request 136, the AP 102 may perform a determination as to whether the STA 120 is authenticated to use the emergency preparedness communications service. For example, the AP 102 may send an inquiry to controller 101 or a third party system (not shown) to determine if the STA 120 is listed as an authorized STA 120. The authentication may also be performed in any other manner. If the STA 120 is determined to be an authorized device through an authentication process, then the operation of the AP 102 may be adjusted to allow for the STA 120 to receive priority in transmitting/receiving subsequent messages. In some cases, the AP 102 may provide an indication of this in a response 138 to the STA 120. In other cases, a separate message exchange enabling the EPCS may be required after the STA 120 has been authenticated.

Subsequent to the STA 120 being given priority by the AP 102, the STA 120 may then begin to transmit/receive messages 140 on a priority basis in association with the AP 102. The manner in which the STA 120 is able to receive such priority may include any methods described herein, such as adjusting contention parameters with respect to that particular STA 120 and/or moving other APs 102 and/or STA(s) 120 to other channels and/or frequency bands.

Eventually, the emergency necessitating a higher priority for messages 140 may subside. In some cases, the STA 120 may send a message 142 to the AP 102 indicating that the emergency has subsided and emergency preparedness communications service is no longer required by the STA 120. However, in other cases, the AP 102 may obtain information that the emergency has subsided through any other methods described herein or otherwise. In such cases, the AP 102 may terminate the priority authorization for the STA 120. In some cases, the AP 102 may provide an indication of such to the STA 120 (not shown). Additionally, in such cases, the AP 102 may also then disable the emergency preparedness communications service such that the STA 120 (or any other STA) may no longer receive authentication for priority messages (until the feature is re-enabled in the AP 102 based on the existence of a subsequent emergency).

It is understood that the above descriptions are for purposes of illustration and are not meant to be limiting. That is, the above descriptions may provide high-level examples of some of the operations performed by the controller(s) 101, AP(s) 102, and/or STA(s) 120, but may not include all operations that may be performed.

Figure 2A:
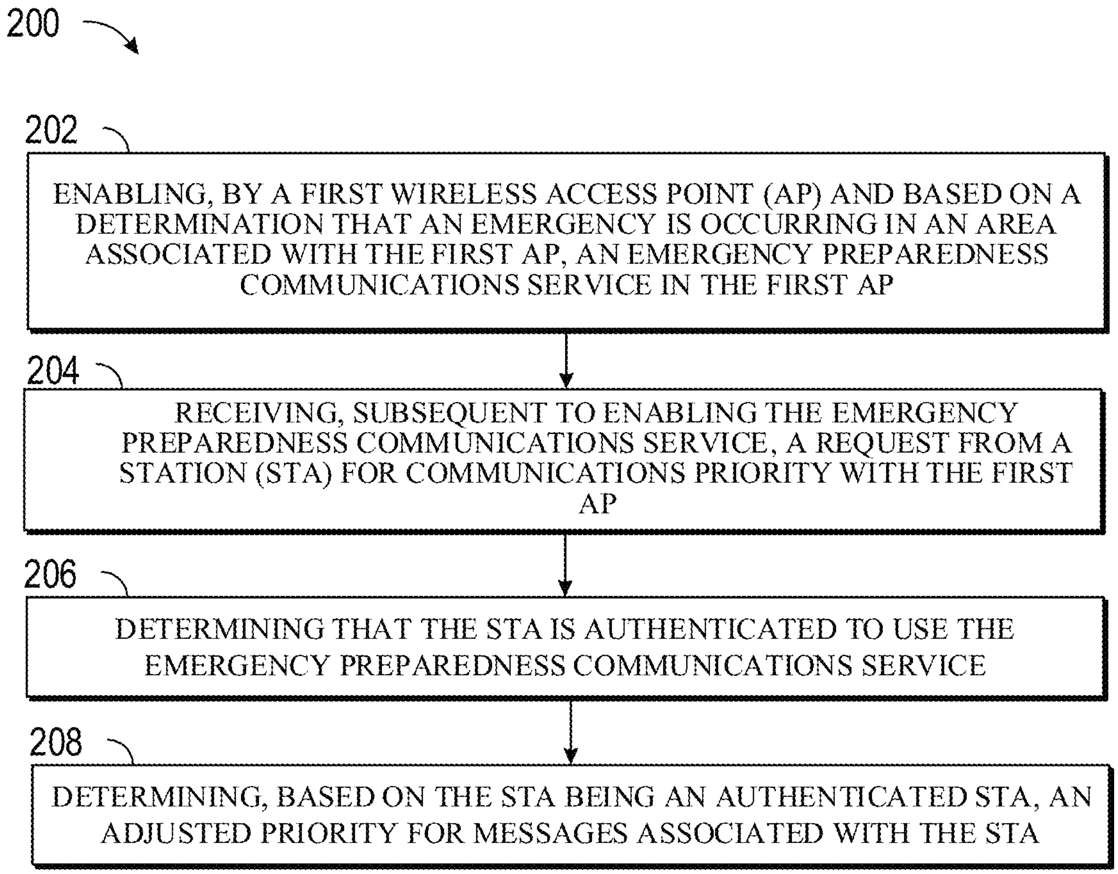
FIGS. 2A-2B illustrate example flow diagrams for priority emergency messages, in accordance with one or more example embodiments of the present disclosure.
Figure 2B:
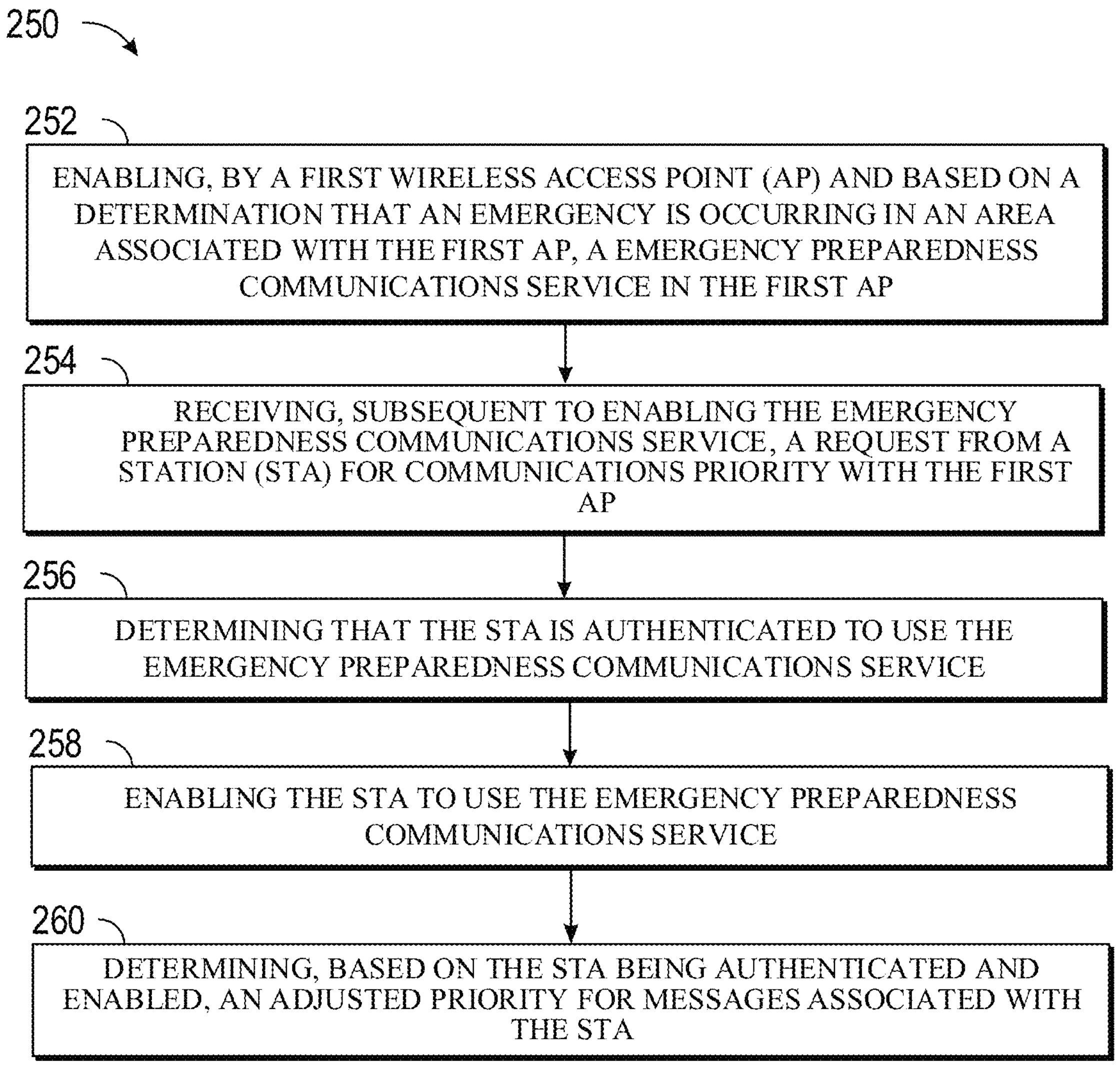

FIGS. 2A-2B illustrate example flow diagrams (for example, flow diagram 200 and flow diagram 250) for priority emergency messages, in accordance with one or more example embodiments of the present disclosure.

Beginning with FIG. 2A, at block 202, a device (e.g., the STA(s) 120, controller(s) 101 and/or the AP 102 of FIG. 1 and/or the device 419 of FIG. 4) may enable, based on a determination that an emergency is occurring in an area associated with the first AP, emergency preparedness communications service in the first AP. At block 204, the device may receive, subsequent to enabling the emergency preparedness communications service, a request from a station (STA) for communications priority with the first AP. At block 206, the device may determine that the STA is authenticated to use the emergency preparedness communications service. At block 208, the device may determine, based on the STA being an authenticated STA, an adjusted priority for messages associated with the STA. It is understood that the above descriptions are for purposes of illustration and are not meant to be limiting.

Turning to FIG. 2B, at block 252, the device may enable, based on a determination that an emergency is occurring in an area associated with the first AP, emergency preparedness communications service in the first AP. At block 254, the device may receive, subsequent to enabling the emergency preparedness communications service, a request from a station (STA) for communications priority with the first AP. At block 256, the device may determine that the STA is authenticated to use the emergency preparedness communications service. At block 258, the device may enable the STA for to use the EPCS. At block 260, the device may determine, based on the STA being an authenticated and enabled, an adjusted priority for messages associated with the STA. It is understood that the above descriptions are for purposes of illustration and are not meant to be limiting.

FIG. 3 shows a functional diagram of an exemplary communication station 300, in accordance with one or more example embodiments of the present disclosure. In one embodiment, FIG. 3 illustrates a functional block diagram of a communication station that may be suitable for use as an AP 102 (FIG. 1), controller 101 (FIG. 1), or a STA 120 (FIG. 1) in accordance with some embodiments. The communication station 300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 300 may include communications circuitry 302 and a transceiver 310 for transmitting and receiving signals to and from other communication stations using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication station 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication station 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 may also store information that may be used in the authorization process for an STA, such as a certification or other information that may be exchanged with an AP. The AP may use this information to determine if the STA is authorized to use the emergency preparedness communications service. As mentioned herein, in some cases, this may involve the AP providing this information to a remote system. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication station 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although the communication station 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 300 may include one or more processors and may be configured with instructions stored on a computer-readable storage device.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UI) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), an EHT TB preamble device 419, a network interface device/transceiver 420 coupled to antenna(s) 430, and one or more sensors 428, such as a global positioning system (GPS) sensor, a compass, an accelerometer, or other sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 402 for generation and processing of the baseband signals and for controlling operations of the main memory 404, and the storage device 416. The baseband processor may be provided on a single radio card, a single chip, or an integrated circuit (IC).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

While the machine-readable medium 422 is illustrated as a single medium, the term "machine-readable medium" may include a single medium or multiple media (e.g., a centralized or distributed database, and/or associated caches and servers) configured to store the one or more instructions 424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "STA," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:

receive, by a first AP and while an STA authentication capability for an emergency preparedness communications service is disabled in the first AP, a notification of a first request from a station (STA) for communications priority with the first AP, wherein STA authentication for the emergency preparedness communications service is disabled in the first AP by default;

disregard, by the first AP and based on the STA authentication for the emergency preparedness communications service being disabled, the first request from the STA for communications priority with the first AP;

enable, based on a determination that an emergency is occurring in an area associated with the first AP, the STA authentication capability of the first AP for the emergency preparedness communications service;

receive, subsequent to enabling the emergency preparedness communications service and by the first AP, a notification of a second request from the STA for communications priority with the first AP;

determine, based on the STA authentication capability of the first AP being enabled, that the STA is authorized to enable the emergency preparedness communications service; and communicate, to the first AP and based on the STA being an authorized STA, an adjusted priority for messages associated with the STA.

2. The device of claim 1, wherein determine the adjusted priority further comprises directing the first AP to adjust a first contention parameter associated with the authorized STA.

3. The device of claim 1, wherein determine that the STA is authorized further comprises:

communicate information from the second request from the STA to an authorization entity; and receive, from the authorization entity, an indication that the STA is authorized.

4. The device of claim 1, wherein the processing circuitry is further configured to:

determine that a second AP is located within a threshold distance from the first AP; and direct the second AP to adjust a second contention parameter associated with the second AP or a second STA associated with the second AP or to transfer communications from a first frequency band to a second frequency band, wherein the second frequency band is different than the first frequency band.

5. The device of claim 1, wherein the processing circuitry is further configured to:

determine that a second AP is located within a threshold distance from the first AP;

determine that the second AP is transmitting or receiving communications in a first channel within a first frequency band, wherein the first AP is also transmitting or receiving communications in the first channel; and send an instruction to the second AP to transfer communications to a second channel within the first frequency band, wherein the second channel is different than the first channel.

6. The device of claim 1, wherein the processing circuitry is further configured to:

determine that the emergency has subsided; and send an instruction to the first AP to disable, based on a determination that the emergency has subsided, the adjusted priority for the STA.

7. The device of claim 1, wherein the processing circuitry is further configured to:

receive a determination from the first AP that the authorized STA has lost communications with the first AP at a first time;

determine that a threshold period of time has elapsed since the first time; and send an instruction to the first AP to disable the adjusted priority of the authorized STA.

8. The device of claim 1, wherein the processing circuitry is further configured to:

determine that the emergency has subsided; and disable, based on a determination that the emergency has subsided, the STA authentication capability of the first AP.

9. A non-transitory computer-readable medium storing computer-executable instructions which when executed by one or more processors of a device result in performing operations comprising:

receiving, by a first AP and while an STA authentication capability for an emergency preparedness communications service is disabled in the first AP, a notification of a first request from a station (STA) for communications priority with the first AP, wherein STA authentication for the emergency preparedness communications service is disabled in the first AP by default;

disregarding, by the first AP and based on the STA authentication for the emergency preparedness communications service being disabled, the first request from the STA for communications priority with the first AP;

enabling, based on a determination that an emergency is occurring in an area associated with the first AP, the STA authentication capability of the first AP for the emergency preparedness communications service;

receiving, subsequent to enabling the emergency preparedness communications service, a notification of a second request from the STA for communications priority with the first AP;

determining, based on the STA authentication capability of the first AP for the emergency preparedness communications service being enabled, that the STA is authorized to use the emergency preparedness communications service; and determining, based on the STA being an authorized STA, an adjusted priority for messages associated with the STA.

10. The non-transitory computer-readable medium of claim 9, wherein determining the adjusted priority further comprises adjusting a first contention parameter associated with the STA.

11. The non-transitory computer-readable medium of claim 9, wherein the computer-executable instructions result in performing operations comprising:

determining that a second AP is located within a threshold distance from the first AP; and send an instruction to the second AP to adjust a second contention parameter associated with the second AP or a second STA associated with the second AP.

12. The non-transitory computer-readable medium of claim 9, wherein the computer-executable instructions result in performing operations comprising:

determining that a second AP is located within a threshold distance from the first AP;

determining that the second AP is transmitting or receiving communications in a first frequency band, wherein the first AP is also transmitting or receiving communications in the first frequency band; and sending an instruction to the second AP to transmit or receive communications in a second frequency band, wherein the second frequency band is different than the first frequency band.

13. The non-transitory computer-readable medium of claim 9, wherein the computer-executable instructions result in performing operations comprising:

determining that a second AP is located within a threshold distance from the first AP;

determining that the second AP is transmitting or receiving communications in a set of one or more channels within a first frequency band, wherein the authorized STA associated with the first AP is also transmitting or receiving communications in at least one channel of the set of one or more channels; and sending an instruction to the second AP to avoid further communications in any channels within the set of one or more channels.

14. The non-transitory computer-readable medium of claim 9, wherein the computer-executable instructions result in performing operations comprising:

disabling, based on a determination that the emergency has subsided, the adjusted priority for the STA.

15. The non-transitory computer-readable medium of claim 9, wherein the computer-executable instructions result in performing operations comprising:

determining that the STA has ceased communications with the first AP at a first time;

determining that a threshold period of time has elapsed since the first time; and disabling the adjusted priority for the STA.

16. A method comprising:

receiving, by a first AP and while an STA authentication capability for an emergency preparedness communications service is disabled in the first AP, a notification of a first request from a station (STA) for communications priority with the first AP, wherein STA authentication for the emergency preparedness communications service is disabled in the first AP by default;

disregarding, by the first AP and based on the STA authentication for the emergency preparedness communications service being disabled, the first request from the STA for communications priority with the first AP;

enabling, based on a determination that an emergency is occurring in an area associated with a first AP, the STA authentication capability of the first AP for the emergency preparedness communications service;

receiving, subsequent to enabling the emergency preparedness communications service, a notification of a second request from the STA for communications priority with the first AP;

determining, based on the STA authentication capability of the first AP for the emergency preparedness communications service being enabled, that the STA is authorized to use the emergency preparedness communications service; and determining, based on the STA being an authorized STA, an adjusted priority for messages associated with the STA.

17. The method of claim 16, wherein determining the adjusted priority further comprises adjusting a first contention parameter associated with the STA, and wherein the method further comprises:

determining that a second AP is located within a threshold distance from the first AP; and adjusting a second contention parameter associated with the second AP or a second STA associated with the second AP.

18. The method of claim 16, further comprising:

determining that a second AP is located within a threshold distance from the first AP;

determining that the second AP is transmitting or receiving communications in a first frequency band, wherein the authorized STA associated with the first AP is also transmitting or receiving communications in the first frequency band; and sending an instruction to the second AP to transfer communications from the first frequency band to a second frequency band, wherein the second frequency band is different than the first frequency band.

19. The method of claim 16, further comprising:

determining that a second AP is located within a threshold distance from the first AP;

determining that the second AP is transmitting or receiving communications in a first channel within a first frequency band, wherein the authorized STA associated with the first AP is also transmitting or receiving communications in the first channel; and sending an instruction to the second AP to transfer communications to a second channel within the first frequency band, wherein the second channel is different than the first channel.

20. The method of claim 16, further comprising:

receiving, subsequent to enabling the emergency preparedness communications service, a second request from a second station (STA) for communications priority with the first AP;

determining that the second STA is not authorized to use the emergency preparedness communications service; and sending an indication to the second STA that the second STA is not authorized.

* * * * *